UNITED STATES PATENT OFFICE.

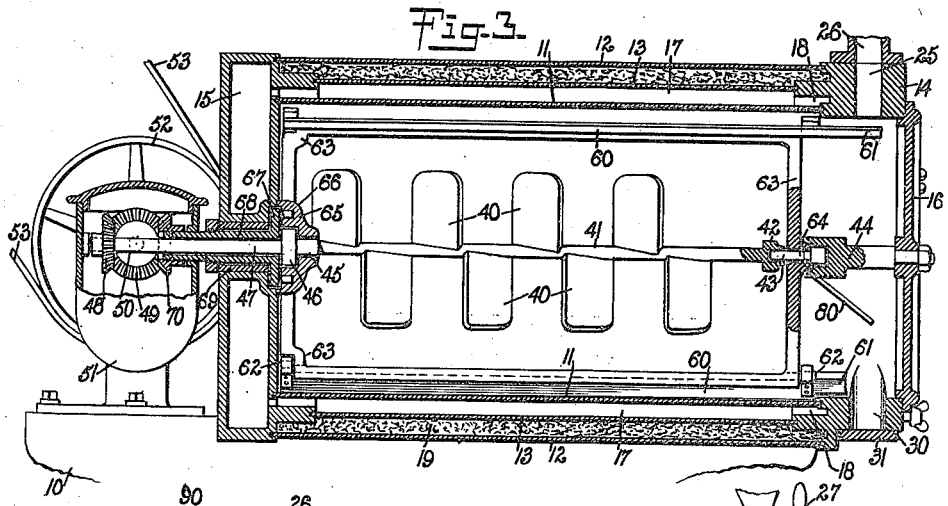
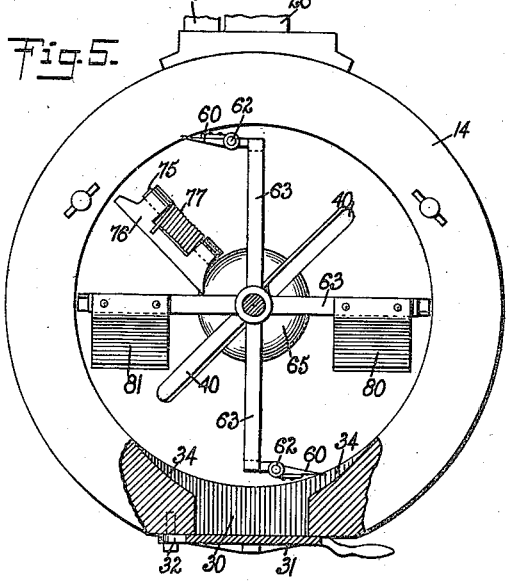
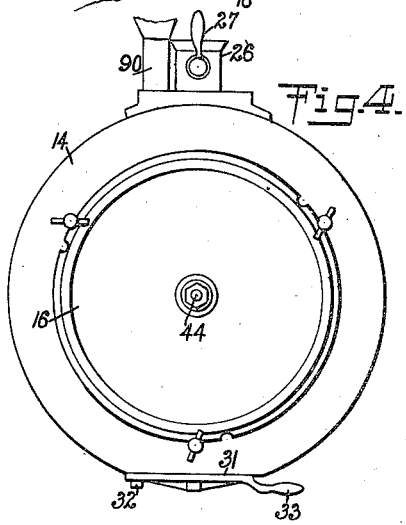
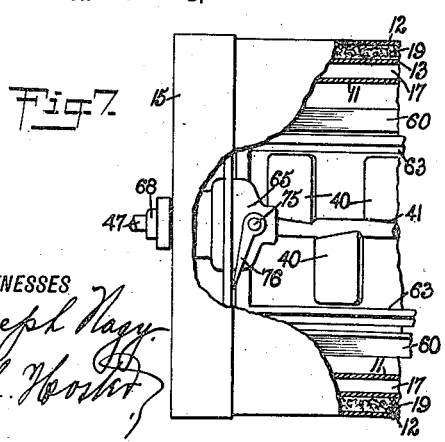
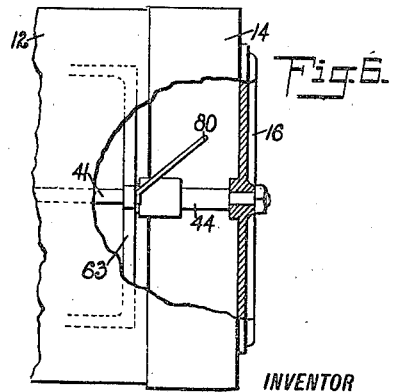

EMERY THOMPSON, OF NEW ROCHELLE, NEW YORK.

ICE-CREAM FREEZER.

1,294,571. Specification of Letters Patent. Patented Feb. 18, 1919.

Application filed June 22, 1917. Serial No. 176,345.

*To all whom it may concern:*

Be it known that I, EMERY THOMPSON, a citizen of the United States, and a resident of New Rochelle, in the county of Westchester and State of New York, have invented a new and Improved Ice-Cream Freezer, of which the following is a full, clear, and exact description.

The invention relates to ice cream freezers such as shown and described in the Letters Patent of the United States, No. 1,232,122 granted to me on July 3, 1917.

The object of the present invention is to provide a new and improved ice cream freezer arranged to provide a proper discharge for the frozen cream without danger of splashing or spilling the cream or requiring shifting of the receiving can during the freezing thereof. Another object of the invention is to insure a thorough agitation of the cream to facilitate the freezing thereof and to prevent the cream while in semi-frozen condition from adhering to the inside of the freezer body thus insuring a free and complete discharge of the frozen cream.

In order to accomplish the desired result, use is made of a cylindrical vessel provided with a head having an opening or filling device at the top and having a valved outlet at the bottom to allow a straight downward discharge of the frozen cream on opening the outlet thereof. Use is also made of a revoluble scraping device within the vessel and adapted to scrape the inner surface of the vessel and the rear head thereof, the said scraping device being provided at its front end with agitating blades extending into the front head to agitate the cream therein.

A practical embodiment of the invention is represented in the accompanying drawings forming a part of this specification, in which similar characters of reference indicate corresponding parts in all the views.

Fig. 3 is a longitudinal central section of the same with parts in elevation;

Fig. 4 is a front end elevation of the same;

Fig. 5 is an enlarged front elevation of the same with the front cover removed and parts of the front head shown in section;

Fig. 6 is a plan view of the front portion of the ice cream freezer with parts broken out; and Fig. 7 is a similar view of the rear end of the ice cream freezer with parts broken out.

Figure 1:
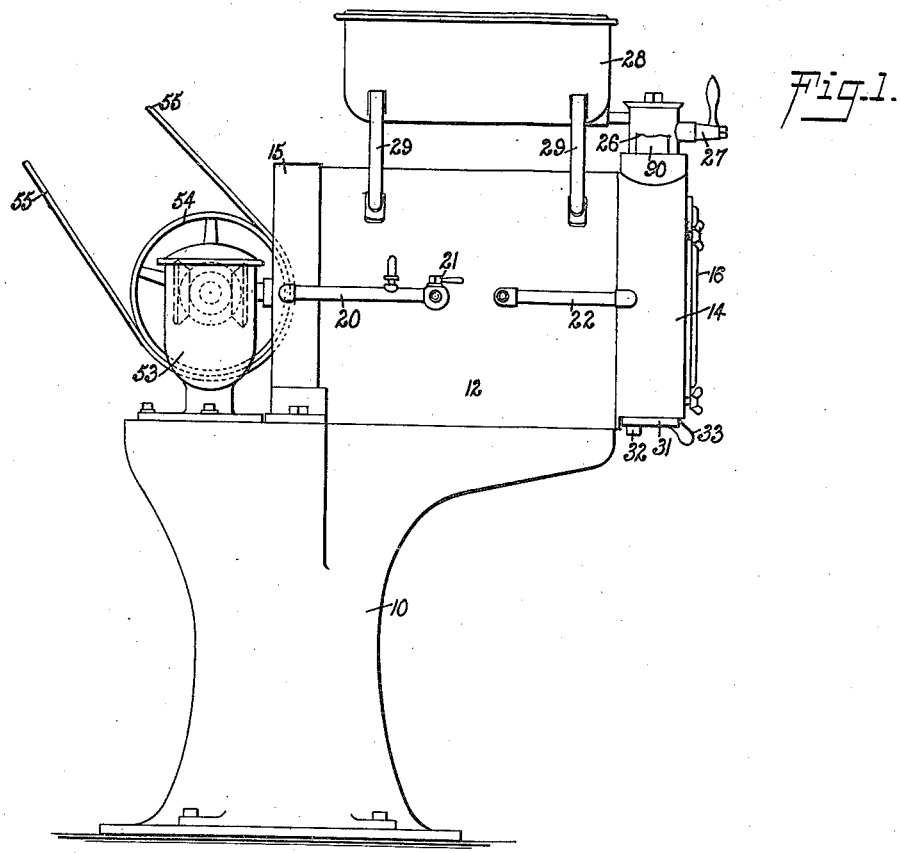
Figure 1 is a side elevation of the ice cream freezer.
Figure 2:
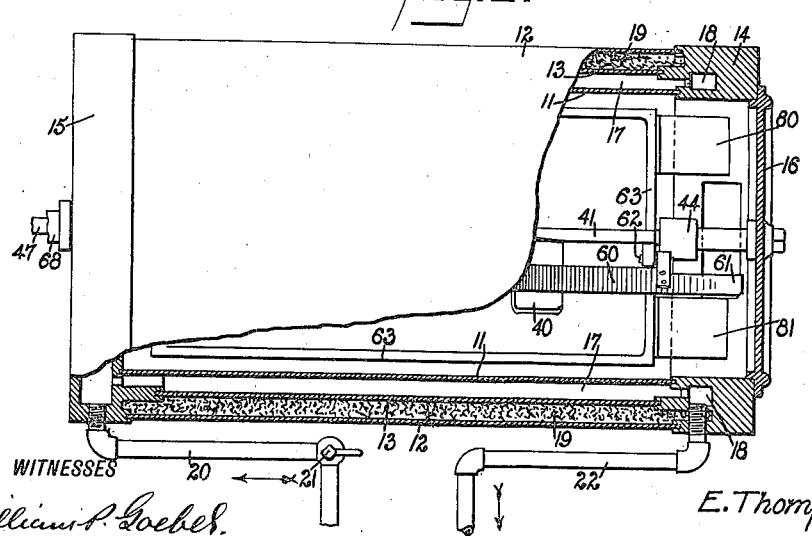
Fig. 2 is an enlarged plan view of the same with parts in section and with the supply pan omitted.

On a suitably constructed stand 10 is mounted a freezer body comprising in its general construction an inner cylindrical shell 11, an outer cylindrical shell 12, an intermediate shell 13, and front and rear heads 14 and 15 common to the three shells 11, 12 and 13. The front head 14 is made ring-shaped and closed at the outer face by a cover 16 bolted or otherwise removably fastened in place on the head 14. The opening in the ring-shaped front head 14 registers with the inner shell 11. By the arrangement described the inner shell forms with the heads 14 and 15 a vessel for the reception of the cream or other material to be frozen. A space between the concentric shells 11 and 13 provides the circulating chamber 17 for the brine or other freezing medium, and the front end of this chamber 17 connects with a recess 18 formed in the inner face of the front head 14. The rear end of the circulating chamber 17 connects with the interior of the rear head 15 which is made hollow, as plainly indicated in Figs. 2 and 3. The space between the concentric shells 12 and 13 is preferably filled with a heat insulating material 19 to keep the circulating freezing medium at as low a temperature as possible during its discharge through chamber 17. The freezing medium is supplied to the interior of the hollow head 15 by a pipe 20 having a valve 21 and connected with a pump or other means for circulating the freezing medium through the head 15 and the chamber 17, the freezing medium passing from the latter into the recess 18 connected with a return pipe 22 for returning the freezing medium to the original supply (see Figs. 1 and 2).

The front head 14 is provided on the top with a filling opening 25 connected with a filling device 26 having a valve 27 connected with a supply pan 28 mounted on brackets 29 held on the top of the outer shell 12. The filling device 26 is directly mounted on the top of the front head 14, and on opening the valve 27 the cream to be frozen is allowed to flow from the pan 28 by way of the filling device 26 and the filling opening 25 into the interior of the vessel formed by the shell 11 and the heads 14 and 15. The bottom of the head 14 is provided with an outlet opening 30 extending straight downward and being closed at the outer end by a valve 31 mounted to swing on a pivot 32 attached to the under side of the front head 14, as plainly shown in Figs. 4 and 5. The valve 31 is provided with a suitable handle 33 to permit the user to conveniently swing the valve 31 into open or closed position. When the freezing operation is completed and the valve 31 is opened then the semi-frozen cream passes straight downward through the opening 30 into a receiving can or other receptacle set directly below the front head 14. Thus by the arrangement described the half frozen cream is not liable to be scattered as it flows in a straight downward direction from the interior of the head 14 into the pan and the latter need not be shifted during the time the partly frozen cream is discharged into the can.

In order to insure a complete draining of the frozen cream from the head into the outlet opening 30 the upper ends of the walls of the latter are preferably cut out as indicated at 34 (see Fig. 5). It will be noticed that the upper ends of the cut-out portions 34 merge with the inner wall of the opening of the ring-shaped head 14 in an approximately tangential direction thus facilitating the downward movement of the frozen cream at the sides of the head into the outlet opening 30.

The cream contained within the freezer body is agitated by the wings 40 of a revoluble agitator provided with a shaft 41 from which the wings extend in the usual manner. The forward end of the agitator shaft 41 terminates in a bearing 42 engaging a short shaft 43 held in a bearing 44 bolted or otherwise attached to the front cover 16, as plainly shown in Fig. 3. The rear end 45 of the agitator shaft 41 is in the form of a polygonal socket and engages the polygonal end 46 of a shaft 47 provided with a bevel gear wheel 48 in mesh with a bevel gear wheel 49 secured on a driven shaft 50 journaled in suitable bearings on the gear casing 51 attached to the stand 10. The shaft 50 is driven from other machinery preferably by the use of a pulley 52 and belt 53 but I do not limit myself to these driving means. When the shaft 50 is rotated a rotary motion is transmitted to the agitator shaft 41 by the gearing described to cause the blades 40 to agitate the cream to be frozen. The inner surface of the shell 11 is adapted to be scraped by scraper blades 60 extending throughout the length of the shell and having extensions 61 at the forward ends engaging the inner surface of the ring-shaped front head 14. The scraper blades 60 are pivoted at 62 on a skeleton frame provided at its forward end with a hub 64 mounted to turn on the shaft 43 (see Fig. 3). The rear end of the frame 62 is provided with a hub 65 forming a bearing for the agitator shaft 41 near the rear end thereof. The hub 65 fits against the inner wall of the hollow head 15 and is engaged by pins 66 projecting from a flange 67 on the inner end of a hollow shaft 68 journaled in a bearing 69 on the rear head 15. On the outer end of the hollow shaft 68 is secured a bevel gear wheel 70 in mesh with the bevel gear wheel 49 diametrically opposite the bevel gear wheel 48 so that when the shaft 50 is rotated the scraper frame 63 is rotated in a direction opposite to that of the agitator. On the hub 65 of the scraping device is secured a radially disposed pin 75 (see Figs. 5 and 7) on which is mounted to swing a scraper 76 engaging the inner face of the rear head 15 to scrape said face when the agitator is revolving. The scraper 76 is pressed in contact with the inner face of the head 15 by a spring 77. The forward end of the skeleton frame 63 is provided with two rigid agitating blades 80 and 81 extending within the opening of the ring-shaped front head 14 and disposed at an angle to the axis of the revoluble scraper frame 63. The agitating blades 80 and 81 are disposed in opposite directions so that when the scraping device is rotated then one of the agitating blades 80 agitates the cream in an outward direction toward the cover 16 while the other agitates the cream in an inward direction thus insuring a thorough agitation of that portion of the cream contained in the opening of the ring-shaped head 14. The top of the ring-shaped head 14 is provided adjacent the filling device 26 with an auxiliary filling device 90 preferably in the form of a funnel for charging the vessel with fruits and the like in addition to the cream introduced through the filling device 26.

The operation is as follows:

When the valve 31 is closed and the valve 27 is opened then the cream to be frozen flows from the pan 28 by way of the filling device 26 and the opening 25 into the interior of the vessel, and when the desired amount of cream has passed into the vessel then the valve 27 is closed and the shaft 50 is rotated to cause the agitating device and the scraping device to revolve in opposite directions within the vessel. The agitator blades 40 of the agitating device aided by the blades 80 and 81 of the scraping device thoroughly agitate the cream which is gradually frozen to uniform texture by the aid of the circulating brine passing through the head 15, the circulating chamber 17 and the recess 18. By the use of the scrapers 60 and 76 the interior walls of the vessel with the exception of the cover 16 are kept free of any cream that may adhere thereto.

It is understood that the scraper blades 60 are forced outward in contact with the inner wall of the shell 11 by centrifugal force aided by the agitated cream while the scraper plate 76 is held in contact with the inner surface of the head 15 by the action of the spring 77. When the cream has been frozen to the desired consistency the valve 31 is opened to allow the frozen cream to flow downward through the open outlet 30 into a can set below the said opening 30.

It will be noticed that the cream frozen to about 27° F., by passing vertically downward, is not liable to splash, and the receiving can need not be shifted as is the case with ice cream freezers having an inclined discharge spout at the cover 16.

It will also be noticed that the shells 11, 12 and 13 are of unbroken continuity and hence their strength is not impaired by the attachment of pipes 20, 22 which connect with the heads 15 and 14, nor by the agitator and the scraping device which are supported from the heads 15 and 16.

By constructing the agitator and scraping device in the manner shown and described they can be readily removed from the vessel and cleaned, sterilized and replaced, it being necessary for the operator only to disconnect the cover 16 from the head 14 and then pull out the agitator and the scraping device from the vessel.

Having thus described my invention, I claim as new and desire to secure by Letters Patent:—

1. In an ice cream freezer, a cylindrical vessel adapted to contain the material to be frozen and provided with heads, of which one is fixed and the other is removable, a bearing carried by the removable head and extending centrally in the said vessel, a short pin held detachably in the said bearing, a revoluble scraping device within the said vessel and having one end journaled on the said pin and having its other end provided with a hub, a sleeve journaled in the said fixed head and detachably connected with the said hub, and a revoluble agitator within the said vessel having one end of its shaft journaled on the said pin and having its other shaft end journaled in the said hub.

2. In an ice cream freezer, a cylindrical vessel adapted to contain the material to be frozen and provided with heads, of which one is fixed and the other is removable, a bearing carried by the removable head and extending centrally in the said vessel, a short pin held detachably in the said bearing, a revoluble scraping device within the said vessel and having one end journaled on the said pin and having its other end provided with a hub, a sleeve journaled in the said fixed head and detachably connected with the said hub, a revoluble agitator within the said vessel having one end of its shaft journaled on the said pin and having its other shaft end journaled in the said hub, and driving means connected with the said sleeve and the said agitator shaft to rotate the said scraping device and the said agitator in opposite directions.

3. In an ice cream freezer, a cylindrical vessel having heads, one head being removable, a pin carried by the removable head, a scraper having one end mounted on the pin and provided with a hub at its other end, said hub having recesses in its face, a shaft projecting into the hub, a sleeve on the shaft and having at its ends a flange provided with pins engaging the recesses of the hub, an agitator having one end of its shaft mounted on the said pin and its other end coupled to the first shaft within the hub, and means for operating the said shaft and sleeve in opposite directions.

4. In an ice cream freezer, a cylindrical vessel having a removable head, a bearing projecting inwardly from the inner face of the removable head, a pin removably held in the bearing, a scraper having one end mounted on the pin and having a hub at its other end, an agitator having its shaft provided at one end with a bearing receiving the said pin and its other end mounted in the hub, and means for operating the hub and agitator shaft in opposite directions.

EMERY THOMPSON.